(12) United States Patent
Teng

(10) Patent No.: US 8,064,530 B2
(45) Date of Patent: Nov. 22, 2011

(54) DEVICE FOR AUTOMATICALLY DETERMINING PN CODE AND RELATED METHOD

(75) Inventor: Chih-Yuan Teng, Taichung (TW)

(73) Assignee: Princeton Technology Corporation, Hsin Tien, Taipei County (TW)

( * ) Notice: Subject to any disclaimer, the term of this patent is extended or adjusted under 35 U.S.C. 154(b) by 950 days.

(21) Appl. No.: 11/987,510

(22) Filed: Nov. 30, 2007

(65) Prior Publication Data

US 2009/0010343 A1     Jan. 8, 2009

(30) Foreign Application Priority Data

Jul. 6, 2007    (TW) ................................ 96124644 A

(51) Int. Cl.
*H04L 27/28* (2006.01)
(52) U.S. Cl. .................. 375/260; 370/203; 455/130
(58) Field of Classification Search .................. 375/259
See application file for complete search history.

(56) References Cited

U.S. PATENT DOCUMENTS

| | | | | |
|---|---|---|---|---|
| 5,881,057 A * | 3/1999 | Komatsu | ................. | 370/335 |
| 5,991,289 A * | 11/1999 | Huang et al. | ................. | 370/350 |
| 6,421,401 B1 * | 7/2002 | Palin | ................. | 375/343 |
| 7,113,806 B2 * | 9/2006 | Gray | ................. | 455/552.1 |
| 2002/0061054 A1 * | 5/2002 | Boloorian | ................. | 375/149 |
| 2004/0116112 A1 * | 6/2004 | Gray | ................. | 455/423 |
| 2005/0152317 A1 * | 7/2005 | Awater et al. | ................. | 370/338 |
| 2005/0154583 A1 * | 7/2005 | Naka et al. | ................. | 704/217 |
| 2006/0133527 A1 * | 6/2006 | Yu et al. | ................. | 375/260 |
| 2006/0146962 A1 * | 7/2006 | Troya et al. | ................. | 375/340 |
| 2006/0193392 A1 * | 8/2006 | Kim et al. | ................. | 375/260 |
| 2007/0092044 A1 * | 4/2007 | Wang et al. | ................. | 375/343 |
| 2007/0200628 A1 * | 8/2007 | Leete | ................. | 330/254 |
| 2007/0217329 A1 * | 9/2007 | Abedi | ................. | 370/208 |
| 2008/0025424 A1 * | 1/2008 | Yang et al. | ................. | 375/260 |
| 2008/0095280 A1 * | 4/2008 | Akahori | ................. | 375/343 |
| 2008/0225694 A1 * | 9/2008 | Yang et al. | ................. | 370/210 |
| 2008/0225969 A1 * | 9/2008 | Yang et al. | ................. | 375/260 |
| 2008/0225977 A1 * | 9/2008 | Yang et al. | ................. | 375/267 |
| 2008/0260076 A1 * | 10/2008 | Lai et al. | ................. | 375/344 |
| 2009/0011722 A1 * | 1/2009 | Kleider et al. | ................. | 455/101 |
| 2010/0027604 A1 * | 2/2010 | Vaidyanathan et al. | ...... | 375/232 |
| 2010/0027718 A1 * | 2/2010 | Vaidyanathan et al. | ...... | 375/340 |

* cited by examiner

*Primary Examiner* — Chieh M Fan
*Assistant Examiner* — Santiago Garcia
(74) *Attorney, Agent, or Firm* — Muncy, Geissler, Olds & Lowe, PLLC

(57) ABSTRACT

A determination method for determining a frame header mode of a DMB-TH system data structure and a determination apparatus thereof. The determination method comprises generating a signal when signal frequencies at a transmitting terminal and a receiving terminal are identical, providing a predetermined process to process the signal, such that the signal forms a peak when a frequency offset occurs, and determining a type of the frame header mode according to the predetermined process.

17 Claims, 7 Drawing Sheets

DEVICE FOR AUTOMATICALLY DETERMINING PN CODE AND RELATED METHOD

BACKGROUND OF THE INVENTION

1. Field of the Invention

The invention relates in general to an automatic detection device for a frame header and a method thereof, and in particular, to a detection device and method for a DMB-TH communication protocol or PN signal mode in TDS OFDM systems.

2. Description of the Related Art

In DMB-TH systems, a data frame typically comprises a 4-layer structure, in which a basic frame is known as a signal frame, including a frame header and a frame body. In DMB-TH systems, the frame header comprises three modes: the frame header signal PN420 with a length of 420 symbols; the frame header signal PN595 with a length of 595 symbols; and the frame header signal PN945 with a length of 945 symbols. During signal transmission, the receiver determines the mode of the frame header of the signal frame, to accordingly perform different processing.

Conventionally, the method of determining the frame header mode is based on distance between two peaks generated by the cross correlation of the frame header sequence when frequencies of the transmitter and the receiver are synchronous.

However when a specific frequency offset occurs between the transmitter and the receiver, for example, frequency offset exceeding 30 KHz in the PN420 mode, and frequency offset exceeding 15 KHz in the PN945 mode, combining multipath effect and low signal to noise ratio (SNR), disturbance to the signal peaks for determining frame header mode renders inaccurate determinations.

As shown in FIG. 1(a), FIG. 1a illustrates the peak generation when the signals at the transmitter and receiver are synchronized, where the distance between two adjacent peaks 10a and 10b can be used to determine the header mode. Please refer to FIG. 1b, FIG. 1b illustrates the peak generation when a frequency difference exists between the signal frequencies at the transmitter and receiver and the peaks are unclear (12b), resulting in difficulty of frame header mode determination.

Thus, a need exists for an amplifier amplifying an input signal without introducing noise to the amplified signal.

BRIEF SUMMARY OF THE INVENTION

A detailed description is given in the following embodiments with reference to the accompanying drawings.

A determination method for determining a frame header mode of a DMB-TH system data structure, comprising generating a signal when signal frequencies at a transmitting terminal and a receiving terminal are identical, providing a predetermined process to process the signal, such that the signal forms a peak when a frequency offset occurs, and determining a type of the frame header mode according to the predetermined process.

According to another embodiment of the invention, a determination method for determining a frame header mode of a DMB-TH system data structure is disclosed, comprising generating a signal when signal frequencies at a transmitting terminal and a receiving terminal are identical, providing a plurality of processing methods, from which one processes the signal, determining whether the signal comprises a peak upon an occurrence of a frequency offset, if not, processing the signal with another processing method, until the signal comprises a peak upon an occurrence of a frequency offset, and determining frame header mode according the processing method.

According to another embodiment of the invention, a determination apparatus capable of determining a frame header mode of a DMB-TH system data structure is provided, comprising a signal generation device, an amplification device, and a determination device. The signal generation device generates a signal when signal frequencies at a transmitting terminal and a receiving terminal are identical. The amplification device provides a predetermined process to process the signal, such that the signal forms a peak when a frequency offset occurs. The determination device determines a type of the frame header mode according to the predetermined process.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

In a DMB-TH system or a TDS OFDM system, the header of a data frame has three modes, namely: header signal PN420 with a length of 420 symbols, comprising a preamble, a PN255 sequence, and a postamble; header signal PN595 with a length of 595 symbols, comprising the first 595 symbols of a pseudorandom binary sequence with a length of 1023; and header signal PN945 with a length of 945 symbols, comprising a preamble, a PN511 sequence, and a postamble.

Figure 1A:
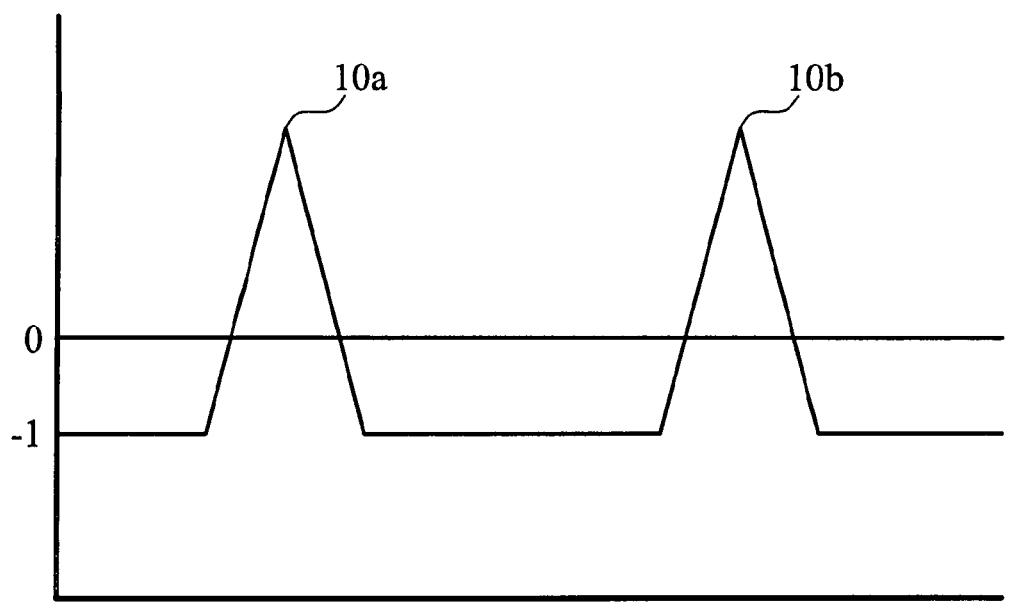
FIG. 1a illustrates the peak generation when the signals at the transmitter and receiver are synchronized.
Figure 1B:
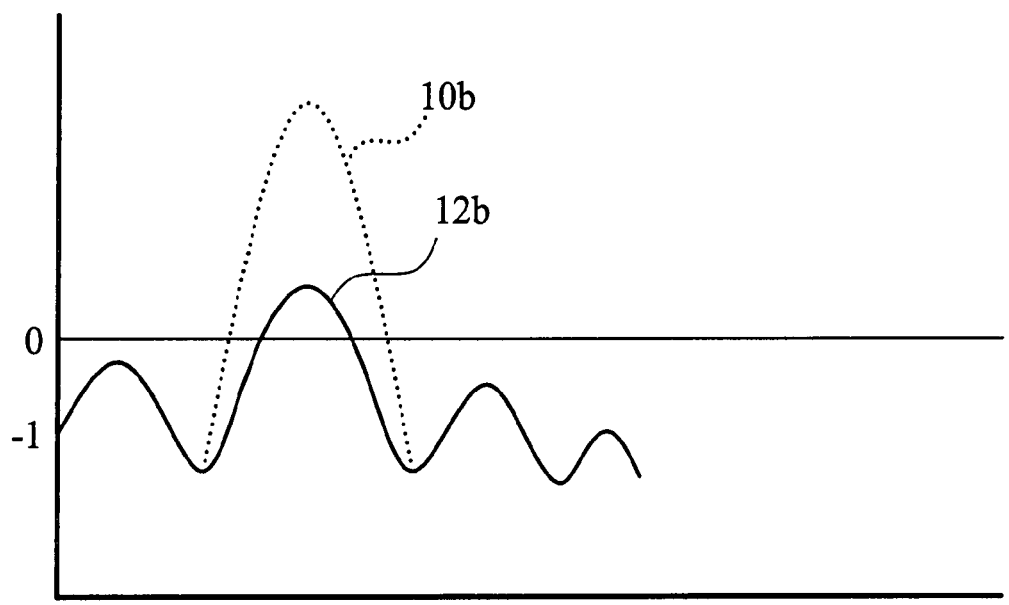
FIG. 1b illustrates the peak generation when a frequency difference exists between the signal frequencies at the transmitter and receiver.
Figure 2:
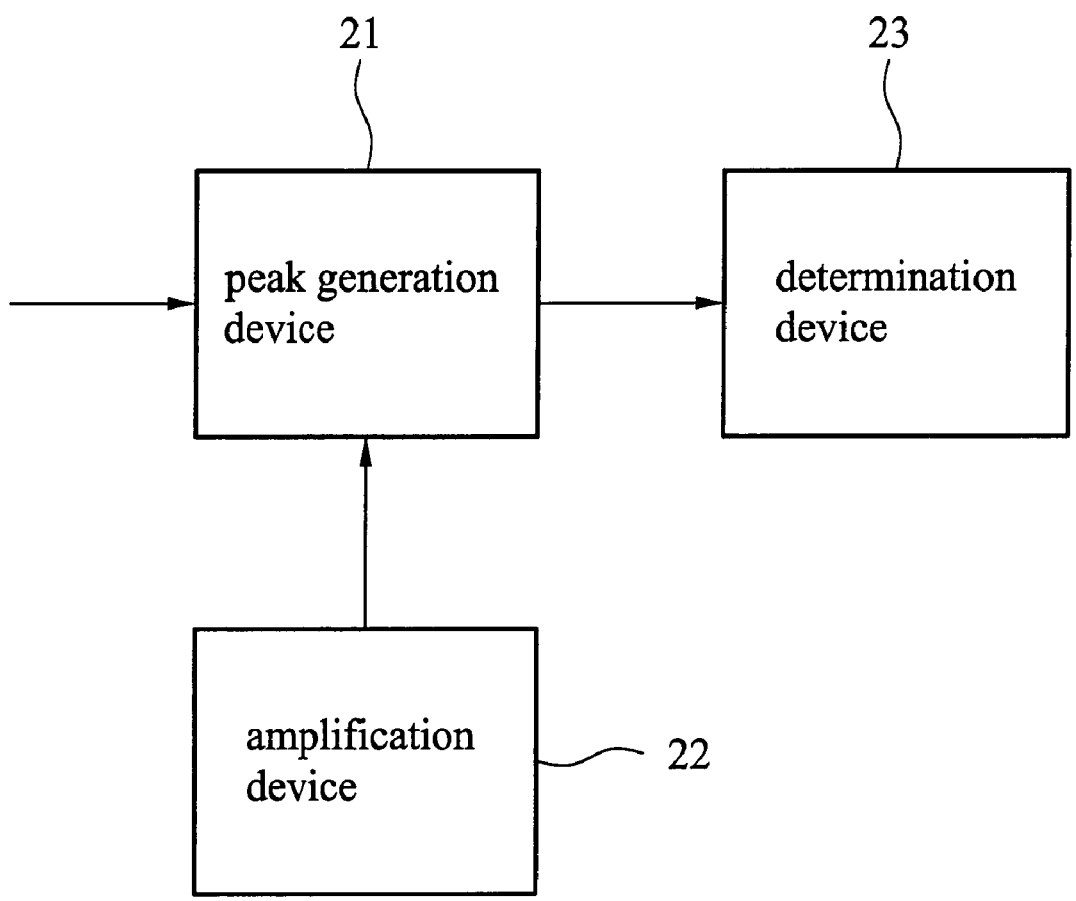
FIG. 2 is a block diagram of an exemplary signal determination device according to the invention.

FIG. 2 is a block diagram of an exemplary signal determination device according to the invention. As shown in FIG. 2, signal determination device 2 comprises peak generation device 21, amplification device 22, and determination device 23. Peak generation device 21 provides a threshold, and determines a peak if the signal generated when the signals at the transmitter and receiver are identical exceeds the threshold. Amplification device 22 amplifies the peak generated by the header signal to identify the peak under a high frequency shift situation. Determination device 23 calculates the distance between two adjacent peaks following the amplification process by amplification device 22, to determine the mode of the header signal.

Figure 3:
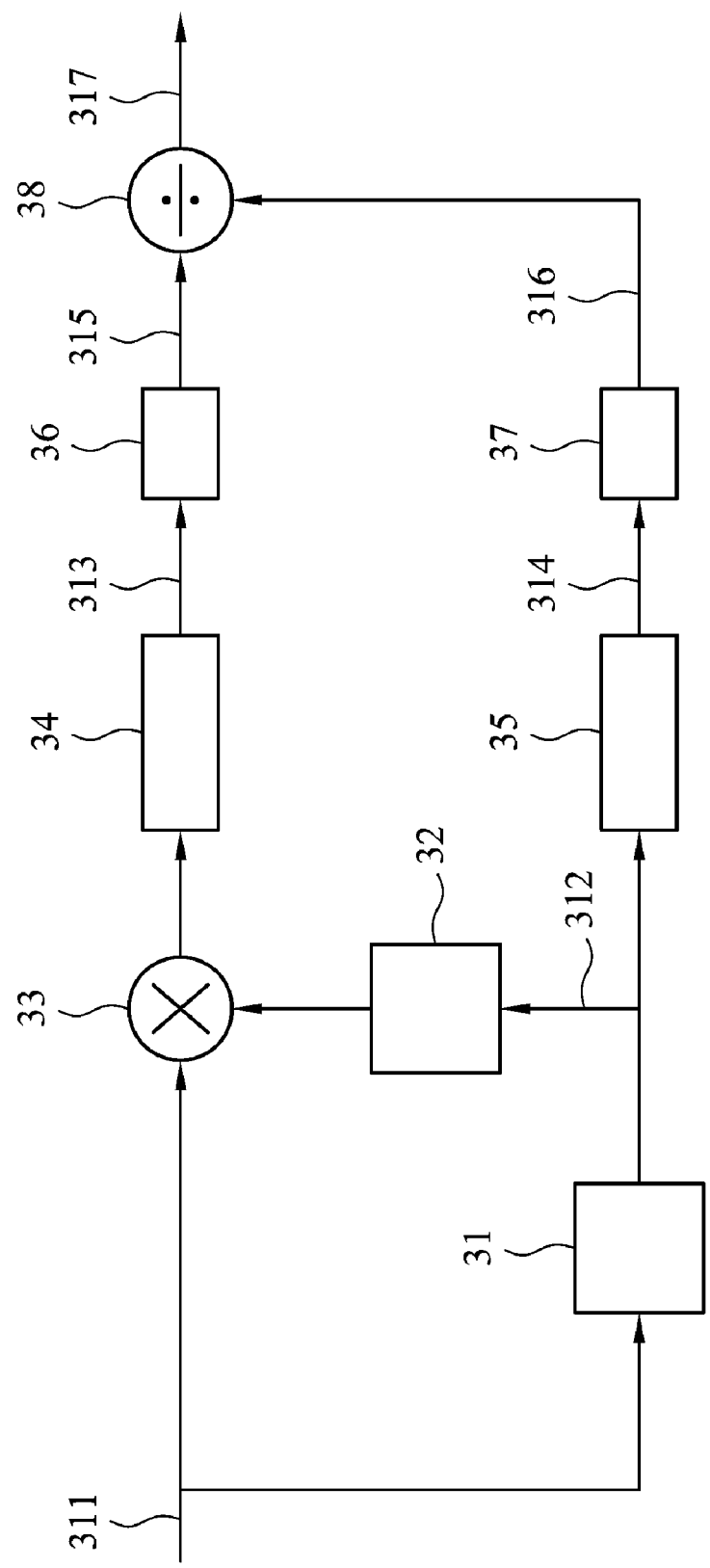
FIG. 3 is a block diagram of an exemplary amplification device according to the invention.

FIG. 3 is a block diagram of an exemplary amplification device according to the invention, comprising delay device 31, logic device 32, multiplier 33, first accumulation device 34, second accumulation device 35, first computation device 36, second computation device 37, and divider 38. Delay device 31 performs delay processes on frame header signal 311. The delay processes comprise 3 types, namely: delay 255 symbols; 511 symbols; and 4375 symbols, wherein each generates a predetermined waveform when processing a particular type of header mode. When determining the mode frame header signal 311, each delay process is performed thereon to generate an accurate amplification result for a predetermined waveform result. After the delay process, frame header signal 311 is processed to provide delayed frame header signal 312. Logic device 32 performs phase conjugate process on delayed frame header signal 312. Multiplier 33 multiplies phase conjugated processed delayed frame header signal 312 by frame header signal 311. First accumulation device 34 accumulates the results of the multiplication to provide first accumulation 313. Second accumulation device 35 accumulates delayed frame header signal 312 to provide second accumulation 314. First computation device 36 squares first accumulation 313 to generate first squared value 315, second computation device 37 squares second accumulation 314 to generate second squared value 316. Divider 38 divides first squared value 315 by second squared value 316 to obtain amplification signal 317. Amplification device 22 utilizes a processing method known as a delayed correlation method.

Figure 4A:
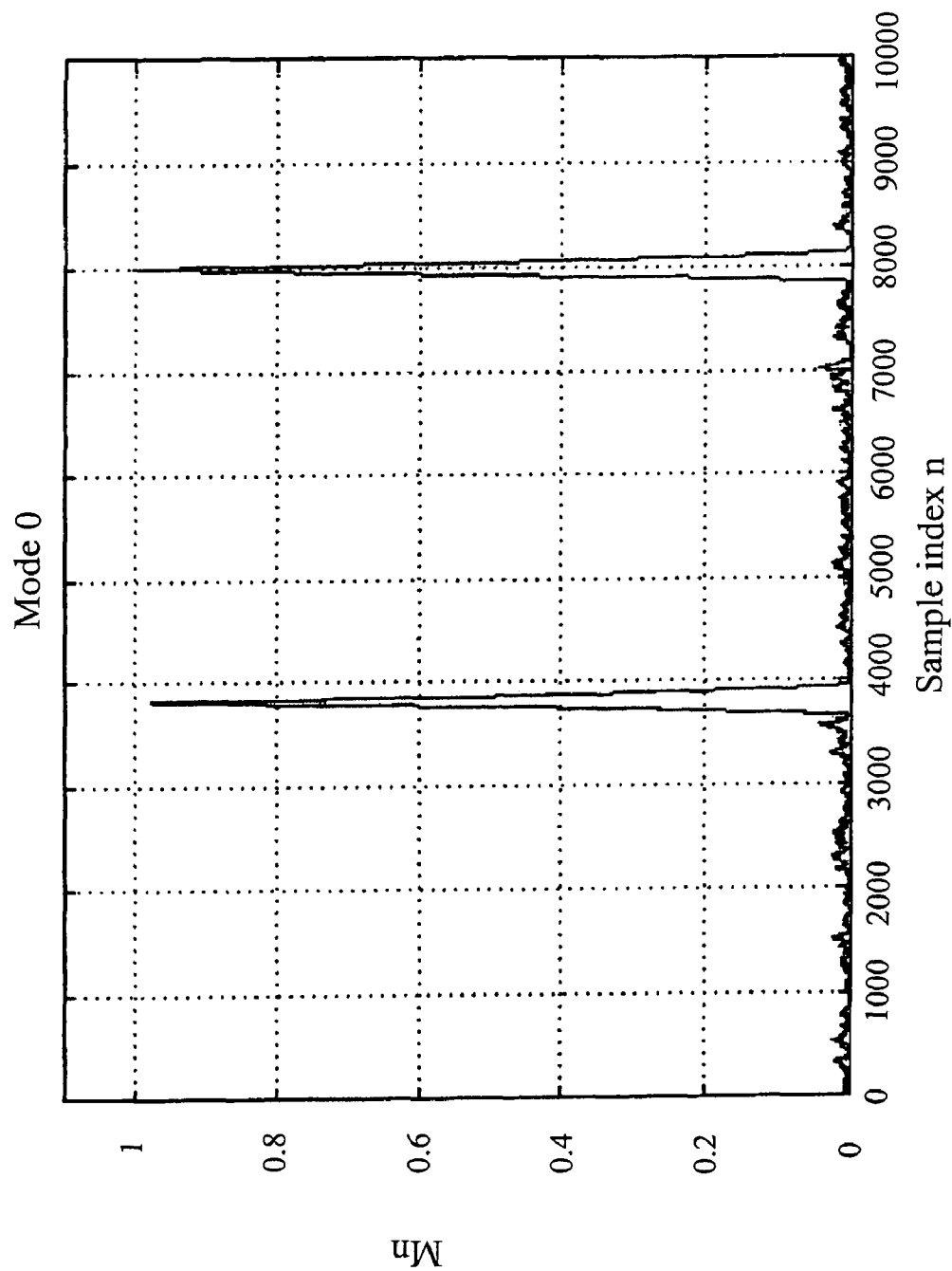
FIGS. 4a, 4b, and 4c show amplified signal diagrams of PN420, PN595, and PN945 according to the invention.
Figure 4B:
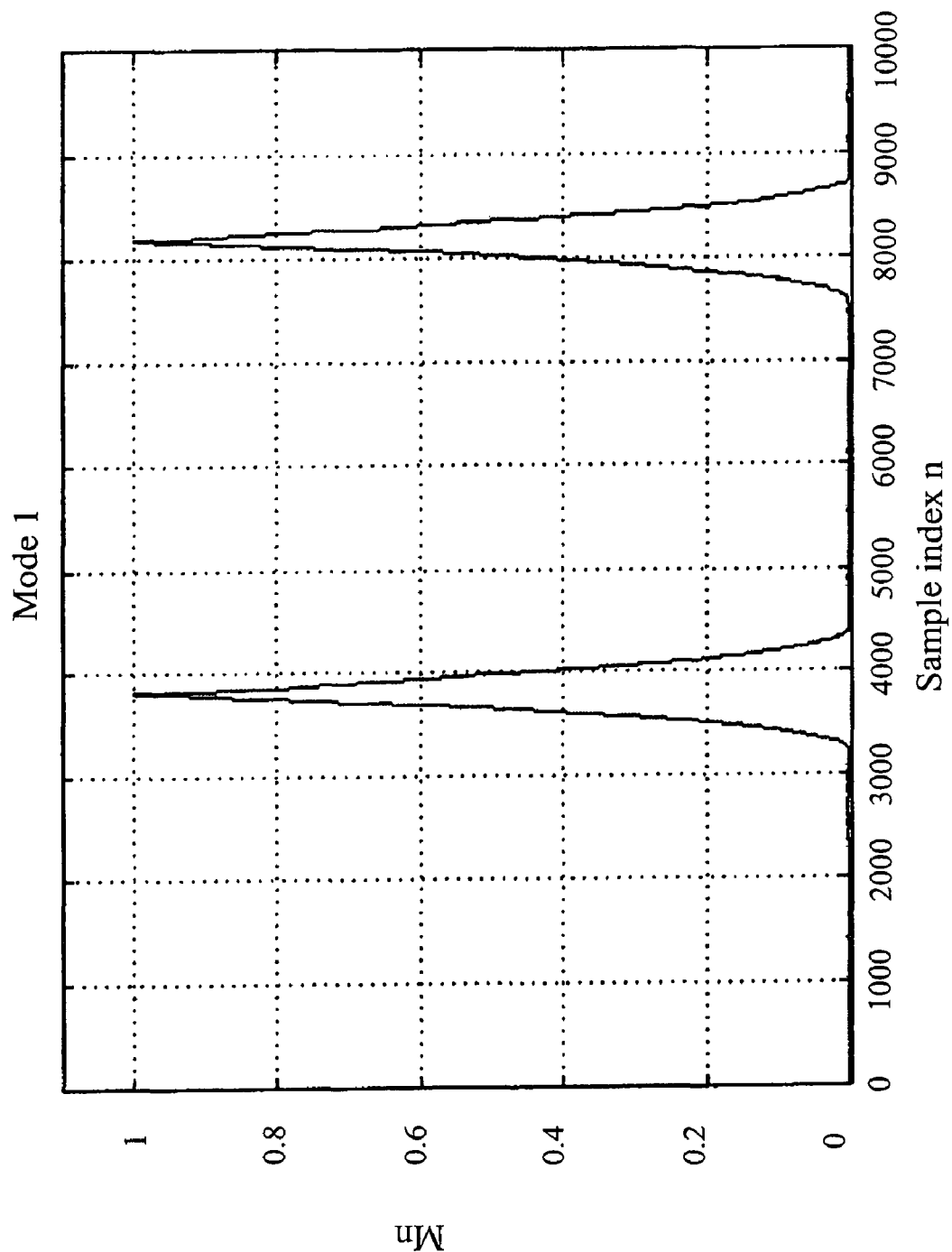
Figure 4C:
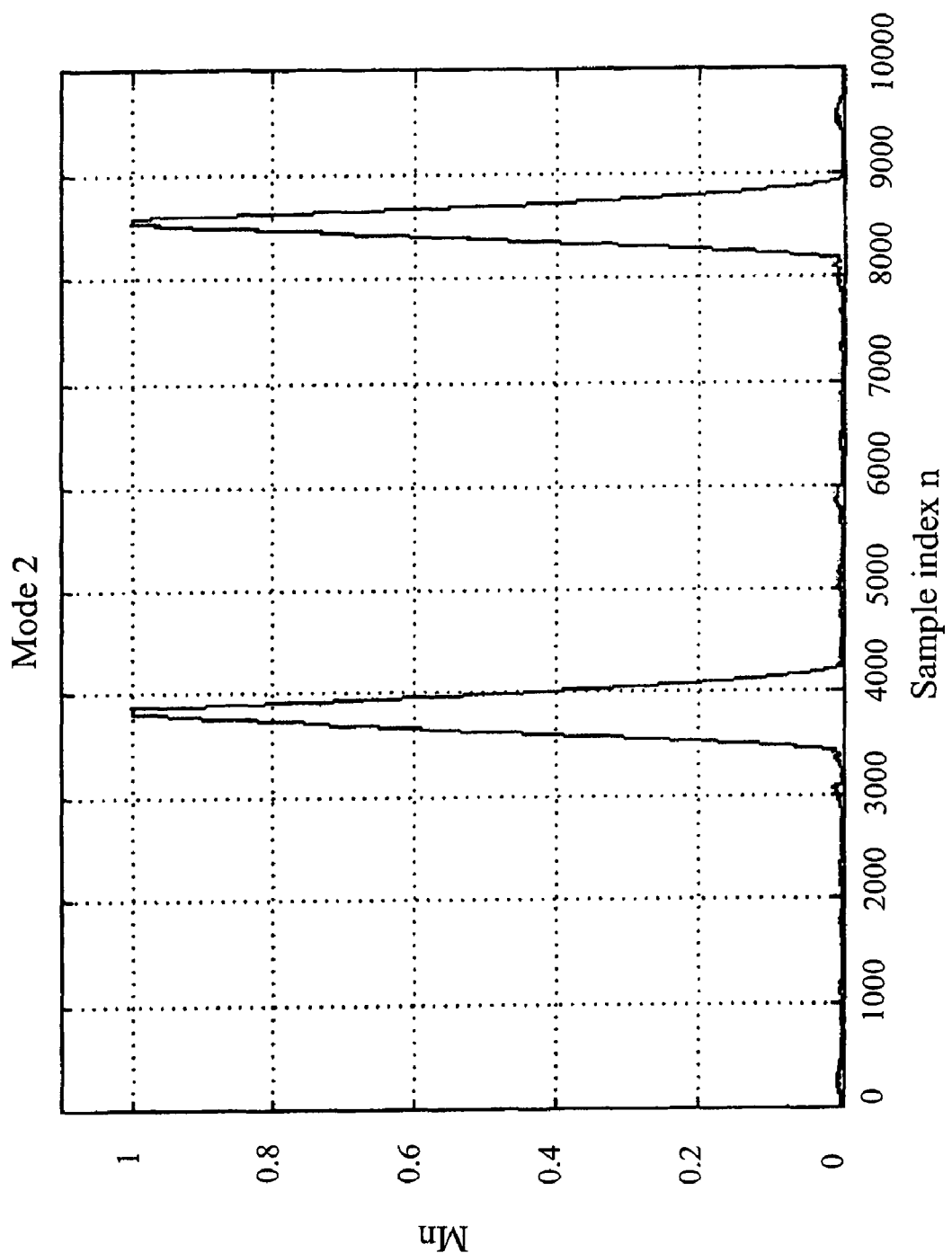

FIG. 4a shows an amplified signal diagram of signal PN420 according to the invention, FIG. 4b shows an amplified signal diagram of signal PN595 according to the invention, FIG. 4c shows an amplified signal diagram of signal PN945 according to the invention. As shown in FIG. 4, amplification device 22 processes frame header signal 311 to provide amplification signal 317, and amplification signal 317 can be identified even when high frequency shift occurs. Amplification device 22 utilizes three methods to perform processing of frame header signal 311, wherein each type of frame header signal 311 corresponds to one method. When processing frame header signal 311 to generate amplification signal 317, the mode of frame header signal 311 is determined by the method amplification device 22 uses for processing frame header signal 311. The processed frame header signal 311 is appropriate for determination device 23 to determine the distance between two adjacent amplification signals 317, to further confirm the type of header mode.

Figure 5:
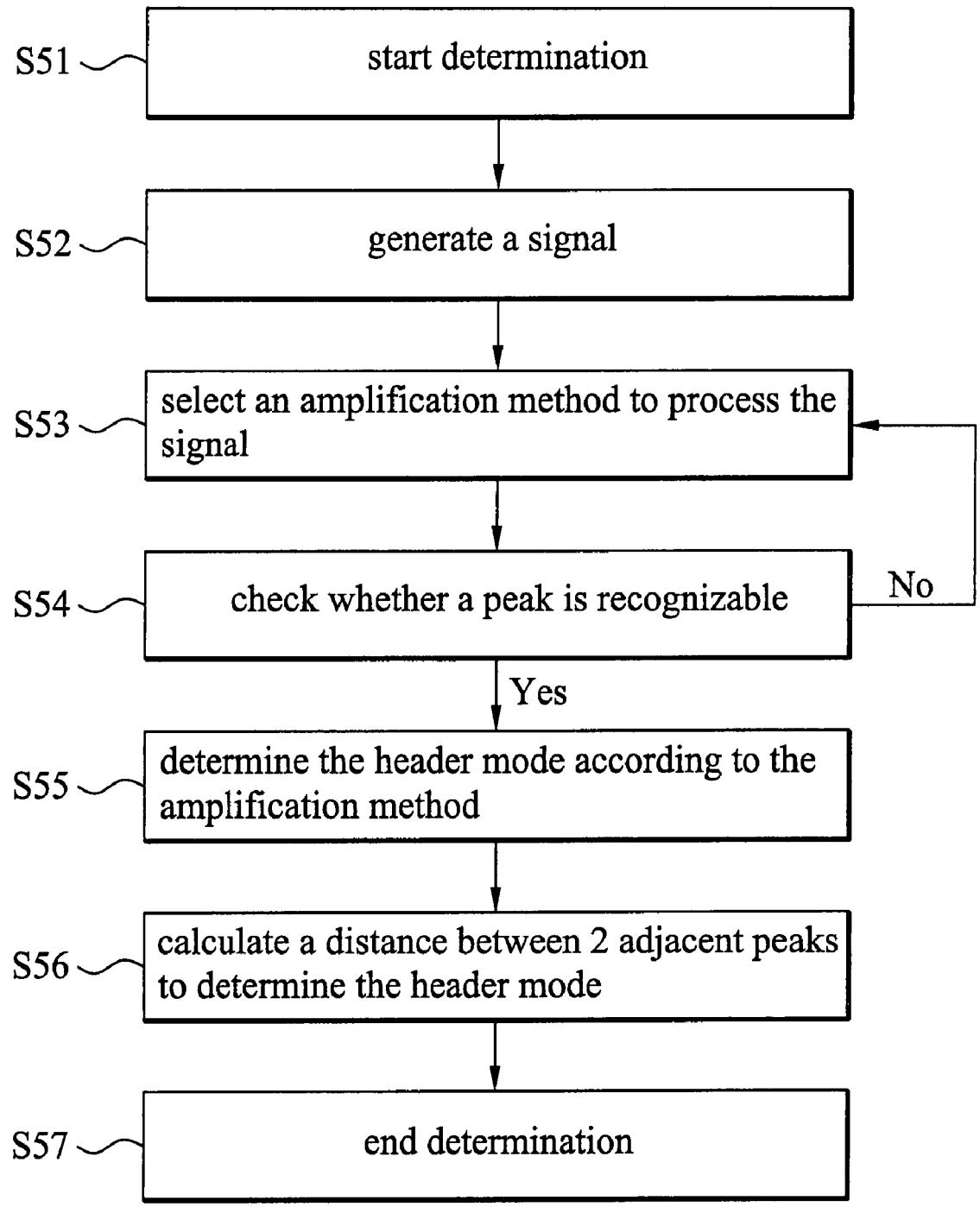
FIG. 5 is a flowchart of an exemplary determination method for header mode according to the invention.

FIG. 5 is a flowchart of an exemplary determination method for header mode according to the invention. Upon initialization (S51), the determination method performs cross correlation when the frequencies of the signals at the transmitter and receiver are identical to generate a signal (S52), utilizes amplification device 22 to select a process to perform thereon (S53), determines whether a peak is identified during a severe frequency shift (S54), if not, utilizes another method by amplification device 22 to process the peak, until the peak is identified clearly, determines header mode according to the method amplification device 22 used for processing the peak (S55), confirms the header mode by calculating the distance between two adjacent peaks, and terminates the determination method (S57).

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A determination method for determining a frame header mode of a DMB-TH system data structure, comprising:
   generating a signal when signal frequencies at a transmitting terminal and a receiving terminal are identical;
   providing a predetermined amplification process to process the signal in order to select the predetermined amplification process such that the signal forms a peak when a frequency offset occurs; and to check if said peak is recognizable during said frequency offset, if not utilize another predetermined amplification process until the peak is clearly identified; and determining a type of the frame header mode from said signal according to the predetermined selected amplification process, wherein the predetermined amplification process comprises:
   a. providing a delay device and a complex conjugate device to process said signal which contains a frame header signal;
   b. providing a multiplier to multiply the frame header signal from said signal by the processed output of the delay device and the complex conjugate device;
   c. accumulating the multiplied output of step b and taking the absolute value of the squared accumulation to obtain a first squared value, and accumulating the frame header signal contained in said signal and taking the squared accumulation to obtain a second squared value; and
   d. dividing the first squared value by the second squared value.

2. The determination method of claim 1, wherein the frame header mode comprises 3 types: frame header mode PN420 with length of 420 symbols, PN595 with length of 595 symbols, and PN945 with length of 945 symbols.

3. The determination method of claim 1, further comprising providing a threshold prior to the formation of the peak, the peak is determined when the signal generated by performing cross correlation when the signal frequencies at the transmitting terminal and the receiving terminal are identical exceeds the threshold.

4. The determination method of claim 1, wherein the predetermined process is a delay correlation method.

5. The determination method of claim 1, wherein the delay device performs a delay process on the frame header signal, and the delay process comprises delaying 255 symbols, 511 symbols, or 4375 symbols.

6. The determination method of claim 5, wherein the delay device performs different delay processes on the frame header signal, wherein one delay process produces a predetermined waveform followed by the predetermined process to operate.

7. A determination method for determining a frame header mode of a DMB-TH system data structure, comprising:
   generating a signal when signal frequencies at a transmitting terminal and a receiving terminal are identical;
   providing a plurality of amplification processing methods, from which the system processes the signal in order to select the predetermined amplification process;
   determining whether the signal comprises a peak upon an occurrence of a frequency offset; and to check if said peak is recognizable during said frequency offset; and
   if not, processing the signal with one of the plurality of amplification processing methods, until the signal comprises a peak upon an occurrence of the frequency offset; and
   determining a type of the frame header mode according the processing method, wherein the processing methods each comprise:

a. providing a delay device and a complex conjugate device to process said signal which contains a frame header signal;

b. providing a multiplier to multiply the frame header signal from said signal by the processed output of the delay device and the complex conjugate device;

c. accumulating the multiplied output of step b and taking the absolute value of the squared accumulation to obtain a first squared value, and accumulating the frame header signal contained in said signal and taking the squared accumulation to obtain a second squared value; and d. dividing the first squared value by the second squared value.

8. The determination method of claim 7, wherein the frame header mode comprises 3 types: frame header mode PN420 with length of 420 symbols, PN595 with length of 595 symbols, and PN945 with length of 945 symbols.

9. The determination method of claim 7, further comprising providing a threshold prior to the formation of the peak, the peak is determined when the signal generated by performing complex conjugate when the signal frequencies at the transmitting terminal and the receiving terminal are identical exceeds the threshold.

10. The determination method of claim 7, wherein the delay device performing a delay process on the frame header signal, and the delay process comprises delaying 255 symbols, 511 symbols, or 4375 symbols.

11. The determination method of claim 7, wherein the delay device performs different delay processes on the frame header signal, wherein one delay process produces a predetermined waveform followed by the predetermined process to operate.

12. A determination apparatus capable of determining a frame header mode of a DMB-TH system data structure, comprising:

a signal generation device, generating a signal when signal frequencies at a transmitting terminal and a receiving terminal are identical;

an amplification device, providing a predetermined amplification process to process the signal, in order to select the predetermined amplification process such that the signal forms a peak when a frequency offset occurs; and to check if said peak is recognizable during said frequency offset, if not utilize another predetermined amplification process until the peak is clearly identified; and a determination device, determining a type of the frame header mode from said signal according to the predetermined selected amplification process, wherein the amplification device comprises:

a delay device, performing a delay process on said signal which contains the frame header signal;

a logic device, inverting the delayed frame header signal from said signal;

a multiplier, multiplying the delayed and inverted frame header signal from said signal by the frame header signal;

a first accumulator, accumulating the result of the multiplier to generate a first accumulation;

a second accumulator, accumulating the result of the delay device to generate a second accumulation;

a first operation device, taking an absolute squared value of the first accumulation to generate a first squared value;

a first operation device, taking an absolute squared value of the second accumulation to generate a second squared value; and a divider, dividing the first squared value by the second squared value.

13. The determination apparatus of claim 12, wherein the frame header mode comprises 3 types: frame header mode PN420 with length of 420 symbols, PN595 with length of 595 symbols, and PN945 with length of 945 symbols.

14. The determination apparatus of claim 12, wherein the signal generation device further provides a threshold prior to the formation of the peak, the peak is determined when the signal generated by performing complex conjugate when the signal frequencies at the transmitting terminal and the receiving terminal are identical exceeds the threshold.

15. The determination apparatus of claim 12, wherein the amplification device performs a delay correlation process on the signal.

16. The determination apparatus of claim 12, wherein the delay process comprises delaying 255 symbols, 511 symbols, or 4375 symbols.

17. The determination apparatus of claim 16, wherein the delay device performs different delay processes on the frame header signal, wherein one delay process produces a predetermined waveform following by the predetermined process to operate.

* * * * *